(12) United States Patent
Zhang et al.

(10) Patent No.: US 11,327,190 B2
(45) Date of Patent: May 10, 2022

(54) RESERVOIR DEFORMATION ESTIMATION

(71) Applicant: Schlumberger Technology Corporation, Sugar Land, TX (US)

(72) Inventors: Xiao Lin Zhang, Beijing (CN); Michael John Williams, West Sussex (GB); Shaoyong Su, Beijing (CN); Yun Ma, Beijing (CN)

(73) Assignee: Schlumberger Technology Corporation, Sugar Land, TX (US)

(*) Notice: Subject to any disclaimer, the term of this patent is extended or adjusted under 35 U.S.C. 154(b) by 166 days.

(21) Appl. No.: 16/474,061

(22) PCT Filed: Dec. 30, 2016

(86) PCT No.: PCT/US2016/069475
§ 371 (c)(1),
(2) Date: Jun. 26, 2019

(87) PCT Pub. No.: WO2018/125205
PCT Pub. Date: Jul. 5, 2018

(65) Prior Publication Data
US 2019/0317233 A1 Oct. 17, 2019

(51) Int. Cl.
*G01V 1/28* (2006.01)
*G01V 1/30* (2006.01)

(52) U.S. Cl.
CPC .............. *G01V 1/288* (2013.01); *G01V 1/301* (2013.01); *G01V 2210/1234* (2013.01); *G01V 2210/646* (2013.01)

(58) Field of Classification Search
None
See application file for complete search history.

(56) References Cited

U.S. PATENT DOCUMENTS

| 8,831,886 B2 | 9/2014 | Williams |
| 2012/0160481 A1 | 6/2012 | Williams |

(Continued)

FOREIGN PATENT DOCUMENTS

WO 2016/099764 A1 6/2016

OTHER PUBLICATIONS

Kijko, "Estimation of the Maximum Earthquake Magnitude, mmax" Pure appl. geophys. 161 (2004) 1655-1681 (Year: 2004).*

(Continued)

*Primary Examiner* — John C Kuan
(74) *Attorney, Agent, or Firm* — Alec J. McGinn

(57) ABSTRACT

A method of characterizing a subterranean geologic formation's response to hydraulic fracturing is presented. The method includes acquiring data representing a plurality of seismic events caused by hydraulic fracturing of the subterranean geologic formation, determining, by at least one electronic processor, a plurality of seismic event moment magnitudes for respective seismic events in the plurality of seismic events, estimating, by at least one electronic processor, a first parameter representing a negative slope of a line relating seismic event frequency to seismic event magnitude for at least some of the plurality of seismic events, estimating, by at least one electronic processor, a second parameter representing an axis intercept of the line, and characterizing the subterranean geologic formation based at least in part on the first parameter and the second parameter

16 Claims, 11 Drawing Sheets

(56) References Cited

U.S. PATENT DOCUMENTS

| | | |
|---|---|---|
| 2013/0044567 A1 | 2/2013 | Kratz |
| 2014/0188447 A1 | 7/2014 | Venkataraman et al. |
| 2015/0006124 A1 | 1/2015 | Zhang et al. |
| 2016/0178798 A1* | 6/2016 | Holland ............... G01V 99/005 703/2 |

OTHER PUBLICATIONS

Zhang et al., "Microseismic Estimates of Stimulated Rock Volume Using a Detection-range Bias Correction: Theory and Case Study" SPE Hydraulic Fracturing Technology Conference Feb. 2014 (Year: 2014).*

International Preliminary Report on Patentability for the equivalent International patent application PCT/US2016/069475 dated Jul. 11, 2019.

Downie, et al., 2013. "Investigating microseismic response and interaction between offset hydraulic fracture treatments during horizontal well completions," SPE Eastern Regional Meeting held in Pittsburgh, Pennsylvania, USA Aug. 20-22, 2013.

Maxwell, et al., "Microseismic deformation rate monitoring," SPE Annual Technical Conferfence and Exhibition held in Denver, Colorado, USA, Sep. 21-24, 2008.

Shapiro, et al., "Seismogenic index and magnitude probability of earthquakes induced during reservoir fluid stimulations," The Leading Edge, Mar. 2010, pp. 304-309.

International Search Report and Written Opinion for the equivalent International patent application PCT/US2016/069475 dated Oct. 25, 2017.

* cited by examiner

RESERVOIR DEFORMATION ESTIMATION

BACKGROUND

In microseismic monitoring, one challenge is to evaluate the reservoir deformation caused by hydraulic fracturing. This information can be used to evaluate the effectiveness of a fracturing operation and help the future design of treatments. Based on the acquired data in microseismic monitoring, the seismic moment of the events (e.g., fracture) can be calculated. Seismic moment represents the rock deformation caused by the event. Summing the seismic moment of the located events provides an estimate of the seismic deformation underground, with the caveat that some subterranean deformation may not produce seismicity.

In the real monitoring case, if the events are far away from receivers, the signal of small moment events is very weak. As such, these events may not be detected and located by monitoring system (monitoring system limitation). In this case, if the moment of located events is directly summed, these small events may be missed. The estimated total moment or deformation may then deviate from the true response, which results in an error in fracturing effectiveness analysis and, potentially, in future fracturing designs based on that analysis.

SUMMARY

In accordance with some embodiments, a computer-implemented method of characterizing a subterranean geologic formation's response to hydraulic fracturing. The method includes acquiring data representing a plurality of seismic events caused by hydraulic fracturing of the subterranean geologic formation, determining, by at least one electronic processor, a plurality of seismic event moment magnitudes for respective seismic events in the plurality of seismic events, estimating, by at least one electronic processor, a first parameter representing a negative slope of a line relating seismic event frequency to seismic event magnitude for at least some of the plurality of seismic events, estimating, by at least one electronic processor, a second parameter representing an axis intercept of the line, and characterizing the subterranean geologic formation based at least in part on the first parameter and the second parameter.

In an embodiment, the characterizing includes: calculating a probability of micro-earthquakes of a predetermined Richter magnitude using the first parameter and the second parameter, and repeatedly updating the probability of micro-earthquakes of the predetermined Richter magnitude.

In an embodiment, the characterizing further includes indicating that a rate of injection of the hydraulic fracturing fluid into the subterranean geologic formation should be adjusted to reduce a probability of micro-earthquakes of the predetermined Richter magnitude.

In an embodiment, the method includes: adjusting the rate of injection of the hydraulic fluid into the subterranean geologic formation consistent with the indicating, and confirming that the adjusting reduces a probability of micro-earthquakes of the predetermined Richter magnitude based on the repeatedly updating.

In an embodiment, the characterizing includes: determining an observed cumulative seismic moment for the plurality of seismic events, determining a theoretical cumulative seismic moment for the plurality of seismic events using the first parameter and the second parameter, determining a complemented total moment using the observed cumulative seismic moment and the theoretical cumulative seismic moment, and determining the deformation of the subterranean reservoir using the complemented total moment.

In an embodiment, the characterizing includes: determining an observed cumulative seismic moment for the plurality of seismic events, determining a theoretical cumulative seismic moment for the plurality of seismic events using the first parameter and the second parameter, comparing the observed cumulative seismic moment to the theoretical cumulative seismic moment, and determining, based on the comparing, a sensitivity limitation on a seismic monitoring system used to monitor the plurality of seismic events.

In an embodiment, the characterizing includes: determining, using the first parameter and the second parameter, an expected rate of seismic event generation caused by the hydraulic fracturing over time, comparing the expected rate of seismic event generation to an observed rate of seismic events, and determining, based on the comparing, whether the observed rate of seismic events exceeds the expected rate of seismic event generation and whether the expected rate of seismic events exceeds the observed rate of seismic events.

In an embodiment, first parameter is the negative slope of the line.

In an embodiment, the second parameter is a y-axis intercept of the line.

In an embodiment, the acquiring data representing the plurality of seismic events includes acquiring data representing fewer than 200 seismic events.

Embodiments of the disclosure may also provide a computing system including one or more processors, and a memory system including one or more computer-readable media storing instructions thereon that, when executed by the one or more processors, are configured to cause the computing system to perform operations for characterizing a subterranean geologic formation's response to hydraulic fracturing. The operations may include acquiring data representing a plurality of seismic events caused by hydraulic fracturing of the subterranean geologic formation, determining, by at least one electronic processor, a plurality of seismic event moment magnitudes for respective seismic events in the plurality of seismic events, estimating, by at least one electronic processor, a first parameter representing a negative slope of a line relating seismic event frequency to seismic event magnitude for at least some of the plurality of seismic events, estimating, by at least one electronic processor, a second parameter representing an axis intercept of the line, and characterizing the subterranean geologic formation based at least in part on the first parameter and the second parameter.

In accordance with some embodiments, a computer-readable storage medium is provided, the medium having a set of one or more programs including instructions that when executed by a computing system cause the computing system to perform operations for characterizing a subterranean geologic formation's response to hydraulic fracturing. The operations may include acquiring data representing a plurality of seismic events caused by hydraulic fracturing of the subterranean geologic formation, determining, by at least one electronic processor, a plurality of seismic event moment magnitudes for respective seismic events in the plurality of seismic events, estimating, by at least one electronic processor, a first parameter representing a negative slope of a line relating seismic event frequency to seismic event magnitude for at least some of the plurality of seismic events, estimating, by at least one electronic processor, a second parameter representing an axis intercept of the line, and characterizing the subterranean geologic formation based at least in part on the first parameter and the second parameter.

In accordance with some embodiments, a computing system is provided that includes at least one processor, at least one memory, and one or more programs stored in the at least one memory. The computing system further includes means for acquiring data representing a plurality of seismic events caused by hydraulic fracturing of the subterranean geologic formation, means for determining a plurality of seismic event moment magnitudes for respective seismic events in the plurality of seismic events, means for estimating a first parameter representing a negative slope of a line relating seismic event frequency to seismic event magnitude for at least some of the plurality of seismic events, means for estimating a second parameter representing an axis intercept of the line, and means for characterizing the subterranean geologic formation based at least in part on the first parameter and the second parameter This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
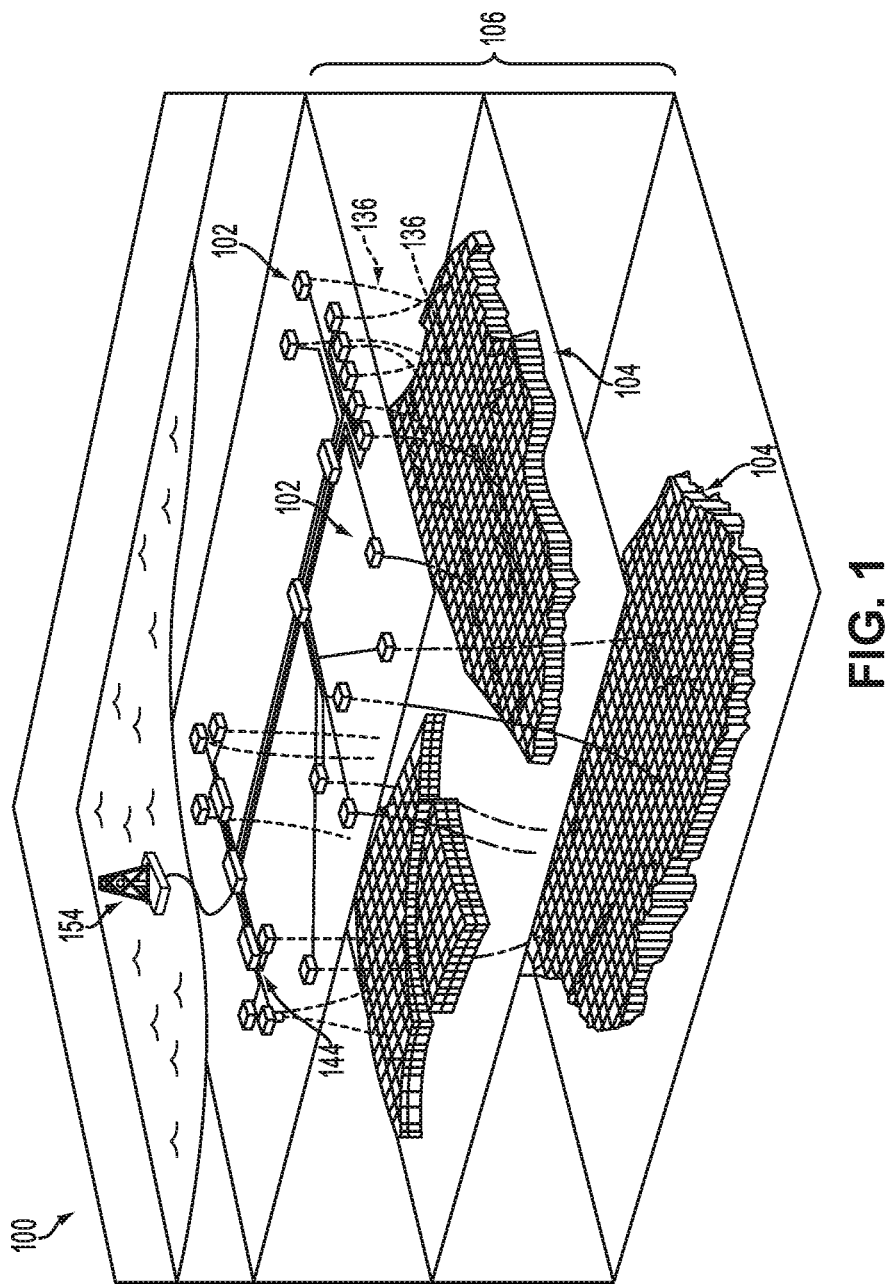
FIG. 1 illustrates a simplified, schematic view of an oilfield and its operation, according to an embodiment.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

In general, monitoring seismic events, such as microseismic events, presents challenges at least, for example, from the perspective of the monitoring equipment's detection limitations. For example, microseismic event detection systems may lack the ability to detect microseismic events that yet have sufficient magnitude to cause rock deformations in the monitored region. Particularly in the case of microseismic events caused by hydraulic fracturing, failure to detect moment-affecting events can cause an estimated total moment or deformation to deviate from the true response. This, in turn, can cause an error in fracturing effectiveness analysis and, potentially, in future designs based on that analysis. Accordingly, some implementations of the present disclosure include techniques for monitoring and processing seismic events, including microseismic events, that accurately determine rock formation deformation caused by such events.

Further, some examples provide techniques for accounting for microseismic events that, while not directly detectible, affect total moment or deformation of a reservoir. Such techniques may enhance an estimated reservoir deformation. Furthermore, the present disclosure includes several additional applications of the disclosed techniques, including characterizing reservoir deformation and other properties, as well as characterizing reservoir monitoring equipment detection limitations,

1. Oilfield Operations & Seismic Monitoring

FIGS. 1, 2, 3, and 4 illustrate example oilfields as contemplated for various examples. Seismic monitoring—including microseismic monitoring—conducted on the oilfields, as shown and described in reference to these figures, may benefit from the techniques disclosed herein.

FIG. 1 illustrates an oilfield 100 in accordance with implementations of various technologies and techniques described herein. As shown, the oilfield has a plurality of wellsites 102 operatively connected to central processing facility 154. The oilfield configuration of FIG. 1 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

The wellsite 102 has equipment that forms wellbores 136 into the earth. The wellbores extend through subterranean formations 106, including reservoirs 104. These reservoirs 104 contain fluids, such as hydrocarbons. The wellsites draw fluid from the reservoirs and pass them to the processing facilities via surface networks 144. The surface networks 144 have tubing and control mechanisms for controlling the flow of fluids from the wellsite to processing facility 154.

Figure 2:
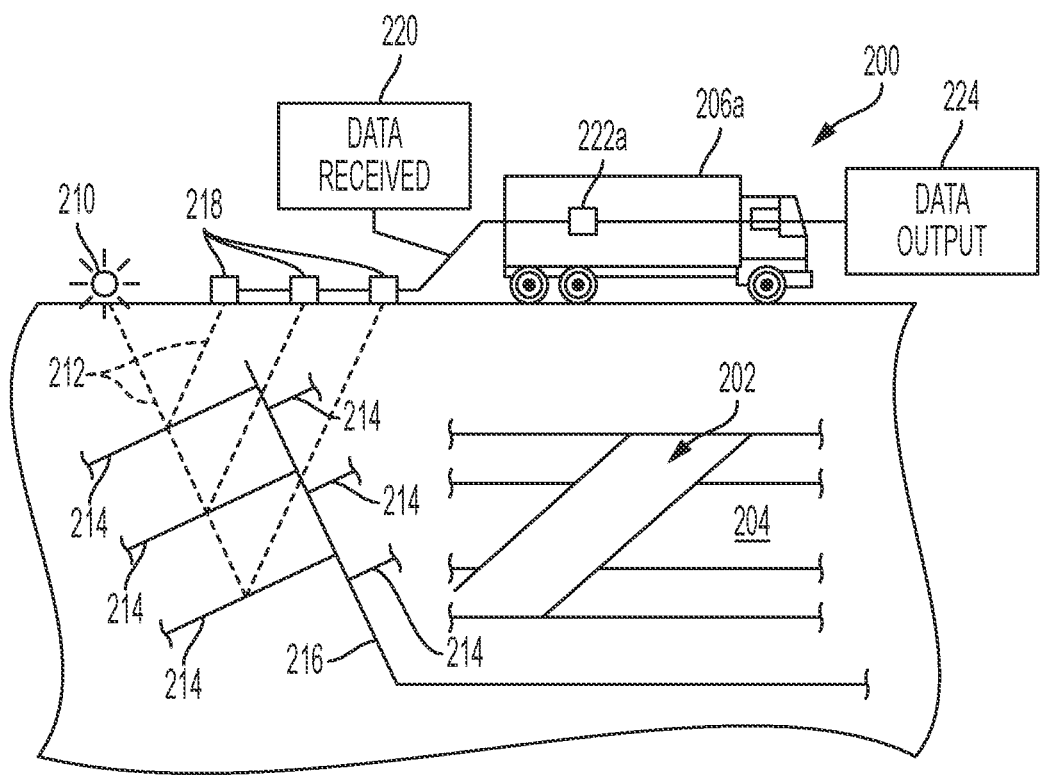
FIG. 2 illustrates a simplified, schematic view of an oilfield with a seismic survey truck, according to an embodiment.

FIG. 2 shows a simplified, schematic view of an oilfield with a seismic survey truck according to some examples. As shown, oilfield 200 has subterranean formation 202 containing petroleum reservoir 204 therein. FIG. 2 also illustrates a seismic survey operation being performed by a survey tool, such as seismic survey truck 206a, to measure properties of the subterranean formation. The survey operation may include an expedient for producing sound vibrations. In FIG. 2, such sound vibration, e.g., sound vibration 212 generated by seismic source 210 (e.g., a seismic shot), reflects off horizons 214 in earth formation 216. Some seismic monitoring, e.g., microseismic monitoring, may omit use of actively generated sound vibrations, instead detecting vibrations resulting from hydraulic fracturing, for example. A set of sound vibrations is received by sensors, such as geophone receivers 218 (a type of seismic receiver), situated on the earth's surface. Geophone receivers 218 may include multiple sensors that measure one or more of pressure, particle acceleration in the vertical direction, and/or particle acceleration in a direction within the horizontal plane (e.g., in one or both of the directions of x- and y-axes situated on a plane parallel to the ground). The data received 220 is provided as input data to a computer 222a of a seismic survey truck 206a, and responsive to the input data, computer 222a generates seismic data output 224. This seismic data output may be stored, transmitted or further processed as desired, for example, as disclosed herein.

Computer facilities may be positioned at various locations about the oilfield 200 and/or at remote locations, e.g., on seismic survey truck 206a. Such computer facilities may be used to communicate with the drilling tools and/or offsite operations, as well as with other surface or downhole sensors. Seismic survey truck 206a is capable of communicating with the drilling tools to send commands to the drilling tools, and to receive data therefrom. Seismic survey truck 206a may also collect data generated during the drilling operation and produce data output 224, which may then be stored or transmitted.

Figure 3:
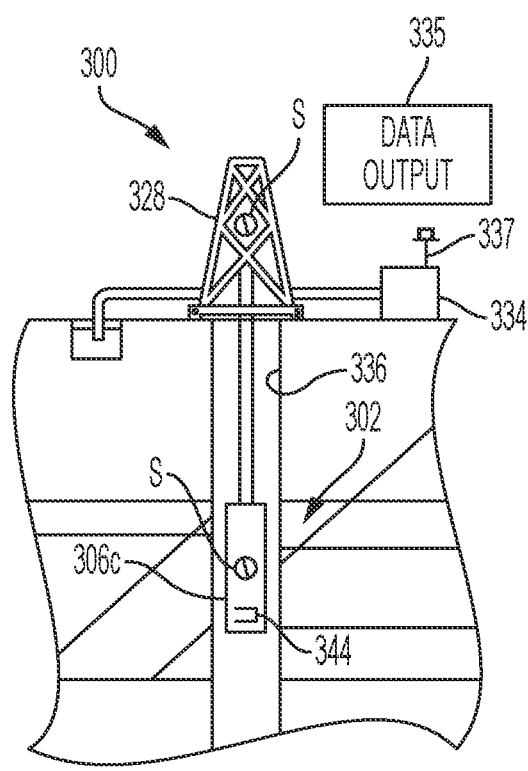
FIG. 3 illustrates a simplified, schematic view of an oilfield with a wireline tool, according to an embodiment.

FIG. 3 shows a simplified, schematic view of an oilfield with a wireline tool according to some examples. In particular, FIG. 3 illustrates a wireline operation being performed by wireline tool 306c suspended by rig 328 and into wellbore 336. Wireline tool 306c is adapted for deployment into wellbore 336 for generating well logs, performing downhole tests and/or collecting samples. Wireline tool 306c may be used to provide another method and apparatus for performing a seismic survey operation, e.g., a microseismic event survey. Wireline tool 306c may, for example, have an explosive, radioactive, electrical, or acoustic energy source 344 that sends and/or receives electrical or other signals to surrounding subterranean formations 302 and fluids therein. Some seismic monitoring may omit use of such active energy sources, instead detecting vibrations produced by hydraulic fracturing, for example. Wireline tool 306c may include one or more geophone receivers, which may include multiple sensors that measure one or more of pressure, particle acceleration in the vertical direction, and/or particle acceleration in a direction within the horizontal plane (e.g., in one or both of the directions of x- and y-axes situated on a plane parallel to the ground).

Note that the technology and elements of FIGS. 1, 2, and 3 may be present in the same oilfield and interact as described presently. That is, oilfield 1 00, oilfield 200 and oilfield 300 may be the same oilfield. Wireline tool 306c of FIG. 3 may be operatively connected to, or provide sound or data signals to, for example, geophone receivers 218 and a computer 222a of seismic survey truck 206a of FIG. 2. Wireline tool 306c may also provide data to surface unit 334. Surface unit 334 may collect data generated during the wireline operation and may produce data output 335 that may be stored or transmitted Wireline tool 306c may be positioned at various depths in the wellbore 336 to provide a seismic survey or other information relating to the subterranean formation 302. Source 21 0, or fracturing caused by hydraulic fluid injection, may provide sound energy that is reflected and then detected by any of geophone receivers 218, sensors (S), or wireline tool 306c.

Sensors (S), such as gauges, geophone receivers 218 of FIG. 2, that are capable of obtaining multiple correlated datasets, may be positioned about oilfield 300 to collect data relating to various field operations as described previously. As shown, sensor S is positioned in wireline tool 306c to measure downhole parameters which relate to, for example porosity, permeability, fluid composition and/or other parameters of the field operation.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may deviate from the drilling plan. Additionally, as drilling, hydraulic fracturing, or other operations are performed, the subsurface conditions may change. The earth model may also be adjusted as new information is collected The data gathered by sensors (S) may be collected by surface unit 334 and/or other data collection sources such as computer 222a of a seismic survey truck 206a for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 334 may include transceiver 337 to allow communications between surface unit 134 and various portions of the oilfield 300 or other locations. Surface unit 134 may also be provided with or functionally connected to one or more controllers (not shown) for actuating mechanisms at oilfield 300. Surface unit 334 may then send command signals to any equipment in oilfield 300 in response to data received. Surface unit 334 may receive commands via transceiver 337 or may itself execute commands to the controller. A processor may be provided to analyze the data (locally or remotely), make the decisions and/or actuate the controller. In this manner, oilfield 300 may be selectively adjusted based on the data collected. This technique may be used to optimize (or improve) portions of the field operation, such as controlling drilling, weight on bit, pump rates, wellbore location or trajectory, hydraulic fluid injection rate, pressure, or amount, or other parameters. These adjustments may be made automatically based on computer protocol, and/or manually by an operator. In some cases, well plans may be adjusted to select optimum (or improved) operating conditions, or to avoid problems.

While FIGS. 2 and 3 illustrate tools used to measure properties of an oilfield, it will be appreciated that the tools may be used in connection with non-oilfield operations, such as gas fields, mines, aquifers, storage (e.g., carbon dioxide storage), or other subterranean facilities. Also, while certain data acquisition tools are depicted, it will be appreciated that various measurement tools capable of sensing parameters, such as pressure, particle acceleration in the direction of any or all three-dimensional axes, seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1, 2, and 3 are intended to provide a brief description of an example of a field usable with oilfield application frameworks. Part, or the entirety, of oilfields 100, 200 and 300 may be on land, water and/or sea. Also, while a single field measured at a single location is depicted, oilfield applications may be utilized with any combination of one or more oilfields, one or more processing facilities and one or more wellsites.

Figure 4:
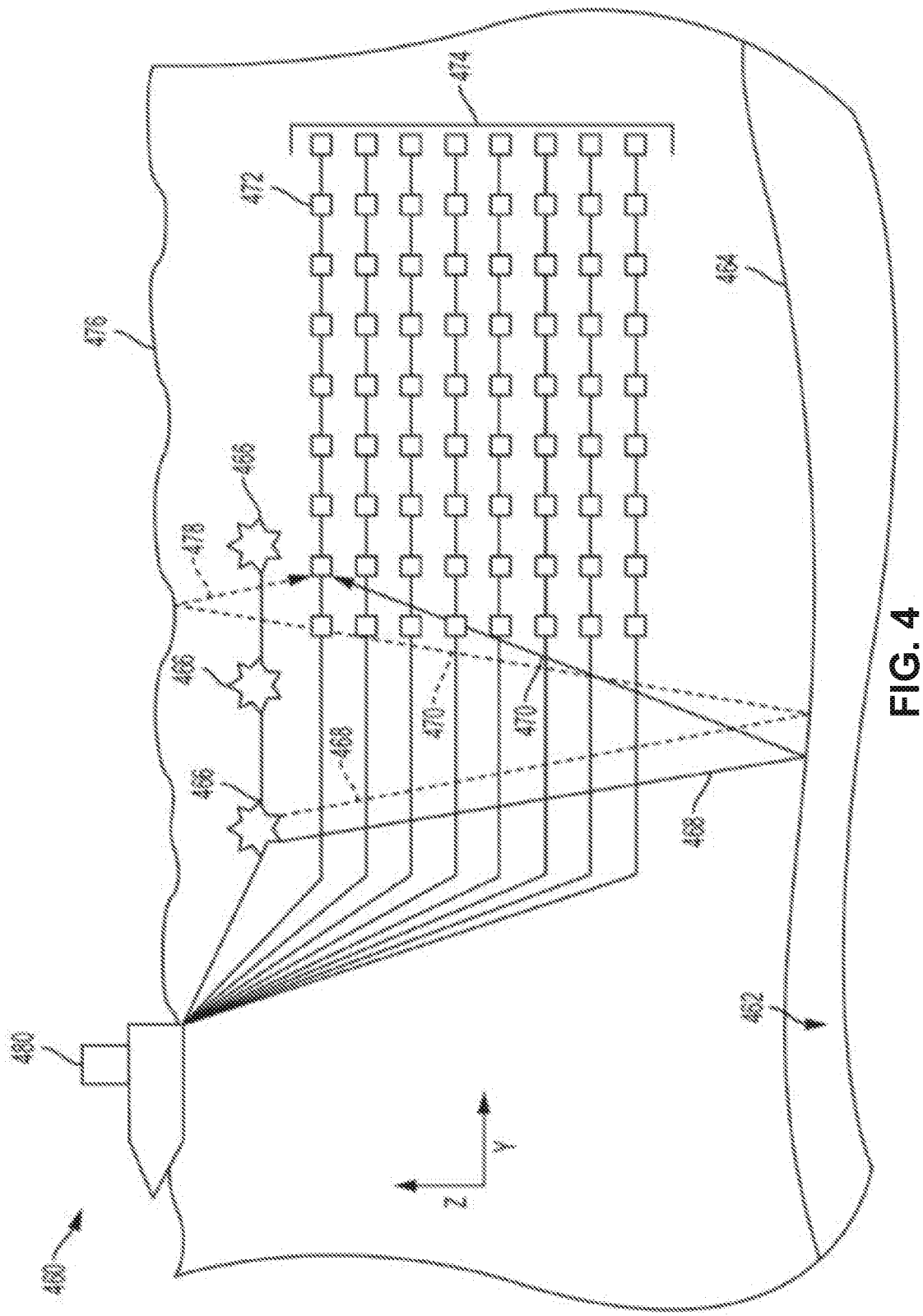
FIG. 4 illustrates a simplified, schematic view of an oilfield with a marine seismic streamer, according to an embodiment.

FIG. 4 shows a simplified, schematic view of an oilfield with a marine seismic streamer according to some examples. That is, FIG. 4 illustrates a side view of a marine-based seismic survey 460 of a subterranean subsurface 462 in accordance with one or more implementations of various techniques described herein. Subsurface 462 includes seafloor surface 4614. Seismic sources 466 may include marine sources such as vibroseis or airguns, which may propagate seismic waves 468 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time. In some implementations, the seismic waves are produced by hydraulic fracturing operations.

The component(s) of the seismic waves 468 may be reflected and converted by seafloor surface 464 (i.e., reflector), and seismic wave reflections 470 may be received by a plurality of seismic receivers 472 (here, marine seismic receivers). In some examples, seismic receivers are employed without the use of artificial seismic wave sources; such embodiments may instead detect vibrations produced by hydraulic fracturing. Seismic receivers 472 may be disposed on a plurality of streamers (i.e., streamer array 474). The seismic receivers 472 may generate electrical signals representative of the received seismic wave reflections 470. The electrical signals may be embedded with information regarding the subsurface 462 and captured as a record of seismic data.

In one implementation, seismic wave reflections 470 may travel upward and reach the water/air interface at the water surface 476, a portion of reflections 470 may then reflect downward again (i.e., sea-surface ghost waves 478) and be received by the plurality of seismic receivers 472. The sea-surface ghost waves 478 may be referred to as surface multiples. The point on the water surface 476 at which the wave is reflected downward is generally referred to as the downward reflection point.

The electrical signals may be transmitted to a vessel 480 via transmission cables, wireless communication or the like. The vessel 480 may then transmit the electrical signals to a data processing center. Alternatively, the vessel 480 may include an onboard computer capable of processing the electrical signals (i.e., seismic survey data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 472. In one implementation, the seismic data may be processed to generate a seismic image of the subsurface 462.

Marine seismic acquisition systems tow the streamers in streamer array 474 at the same depth (e.g., 5-10m). However, marine based survey 460 may tow the streamers in streamer array 474 at different depths such that seismic data may be acquired and processed in a manner that avoids the effects of destructive interference due to sea-surface ghost waves. For instance, marine-based survey 460 of FIG. 4 illustrates eight streamers towed by vessel 480 at eight different depths. The depth of the individual streamers may be controlled and maintained using the birds disposed on the streamers.

I. Gutenberg-Richter Parameter Estimation and Applications

Figure 5:
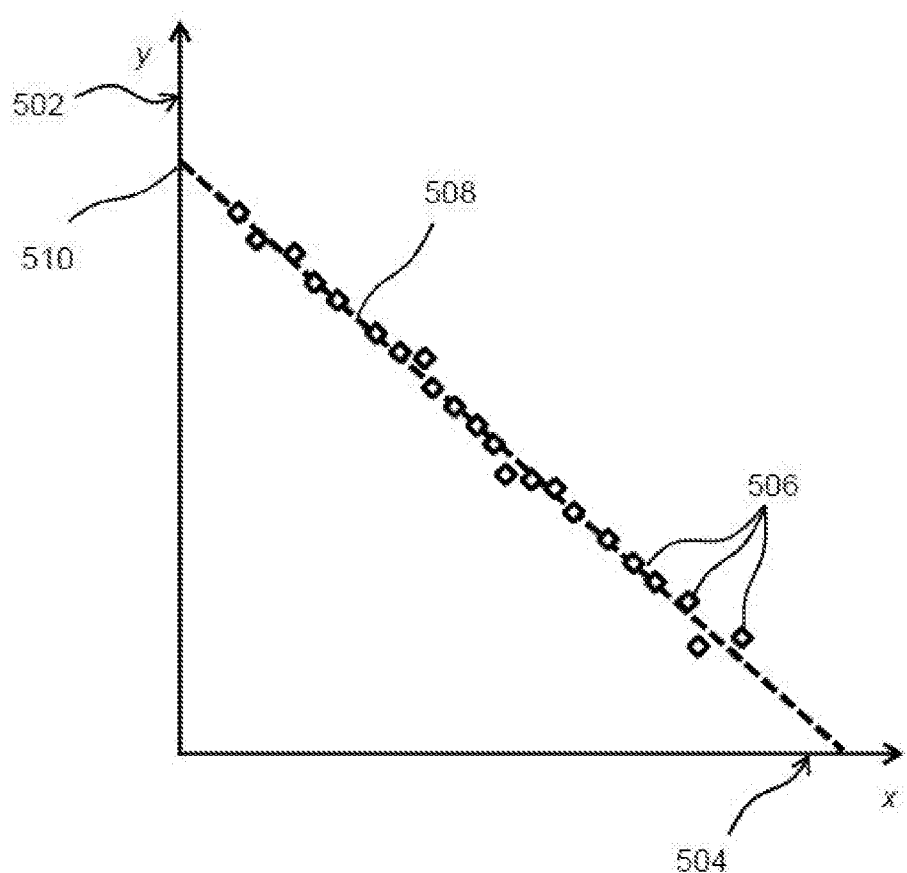
FIG. 5 illustrates a graph consistent with the Gutenberg-Richter distribution, according to an embodiment.

FIG. 5 illustrates a graph 500 consistent with the Gutenberg-Richter distribution. In general. The Gutenberg-Richter distribution describes the relation between the number of seismic events and event moment (i.e., magnitude) in a geological area. According to the Gutenberg-Richter distribution, the relation between event number and moment magnitude may be represented as, by way of non-limiting example:

$$N=10^{a-bM_w} \quad (1)$$

In Equation (1), $M_w$ represents moment magnitude, which can be converted from seismic moment $M_0$ as follows.

$$\log_{10}(M_0)=1.5M_w+9.1 \quad (2)$$

Further, in Equation (1), the term N represents the event number with moment magnitude greater or equal to $M_w$.

Thus, graph 500 depicts the number of events on y-axis 502, where the y-axis is logarithmic, and the magnitude of the events on x-axis 504. The individual symbols of symbols 506 represent one or more events. Note that the events depicted on graph 500 may fit to line 508. Line 508 is depicted solely to illustrate the general linear nature of the distribution of symbols 506.

In attempting to fit a more accurate line than line 508 to symbols 506, two parameters may be specified. That is, there are two unknown parameters in the Gutenberg-Richter distribution, generally denoted as "a" and "b". The "b" parameter represents the negative slope of line 508. The other parameter, "a", represents the y-axis intercept 510 of line 508. Known techniques for estimating "a" values have several deficiencies, including inaccuracy and the requirement for data from thousands (or more) of seismic events from which to calculate "a".

From Equation (1), an expression for "a" may be represented as follows, by way of non-limiting example.

$$a = \log(N) + bM_w \tag{3}$$

Note that the Gutenberg-Richter model assumes events with the corresponding moments, down to zero, exist. In the real monitoring case, small moment events are not detected and located by the monitoring system. Therefore, the total event number observed is less than the total number of events that have been created. Also, large moment events are statistically unlikely to occur in a given observed data set; for these events, due to the occurrence or non-occurrence of a single large event, the observed distribution may apparently deviate from the theoretical Gutenberg-Richter distribution. This deviation may also introduce an error during "a" value estimation Embodiments of the present disclosure may provide techniques for combining an estimated "b" value result and Gutenberg-Richter distribution to estimate any moments that are not observed due to the system detection limitations. Some disclosed techniques provide accurate techniques for estimating the "a" value, calculating the theoretical total moment using the "a" value, and integrating the observed result and theoretical result to obtain the complete cumulative moment. Other applications of the disclosed techniques are also presented.

Disclosed techniques may determine the "a" in the Gutenberg-Richter distribution, e.g., using few detected events. This value can help to provide a robust application of seismogenic index. The seismogenic index, in turn, may be used to predict the probability of large-magnitude earthquake, e.g., in the shale or hot-rock geothermal. Further, disclosed techniques can determine a complemented total moment/deformation of a reservoir. Estimation of the total moment caused by both observed and unobserved events may help to obtain a more accurate total moment/deformation result.

Figure 6:
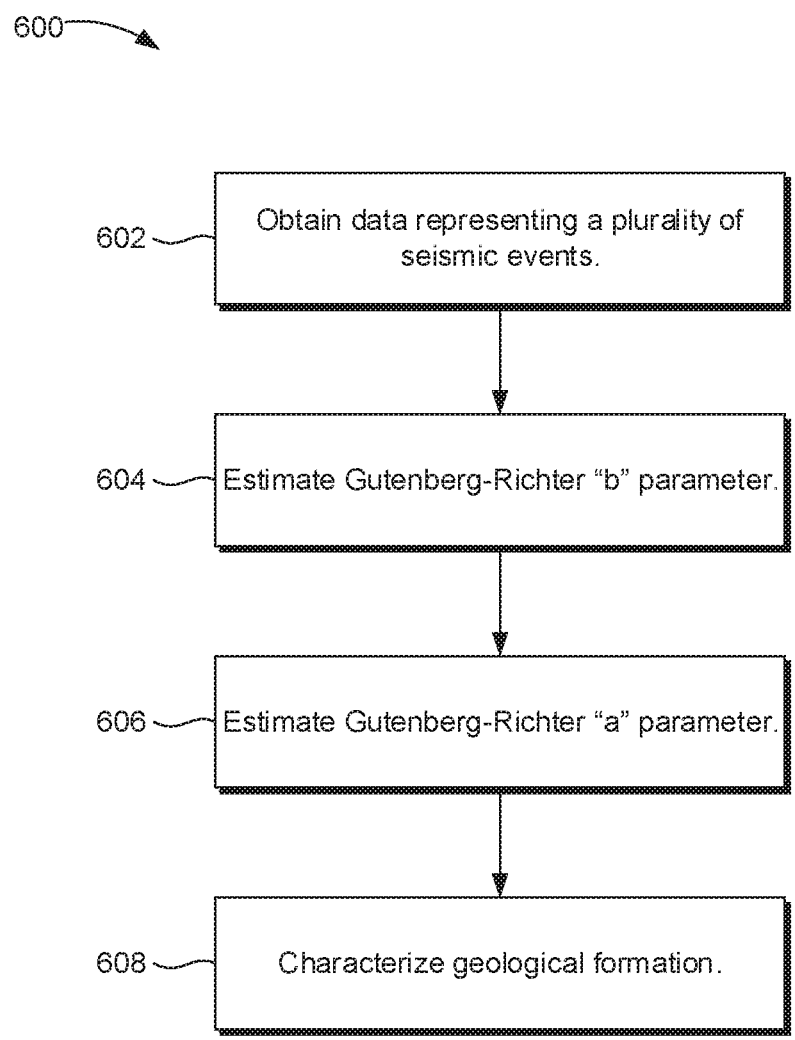
FIG. 6 illustrates a flowchart of a method of characterizing a subterranean geologic formation's response to hydraulic fracturing, according to an embodiment.

FIG. 6 is a flowchart illustrating a method 600 according to some examples. The method 600 of FIG. 6 may be implemented on a system such as that shown and described in reference to FIG. 9, for example. Further, it will be appreciated that the illustrated and below-described blocks in this method 600 may be combined, separated into two or more blocks, re-ordered, or performed simultaneously (e.g., in parallel).

At block 602, the method 600 includes obtaining data representing a plurality of seismic events. The seismic events may occur as the result of hydraulic fracturing operations. The data may be obtained by retrieval from electronic persistent memory, for example, or from an entity that generates, possesses, or has access to the data. Such retrieval may be over a local network, from an attached electronic persistent storage device, or over a wide area network such as the internet.

In some examples, obtaining the data is a separate, independent process from the process of generating the data by empirical measurement. Thus, in some embodiments, seismic data may be measured by one entity through the usage of, for example, geophones or seismic streamers towed by a marine vehicle, and then transferred or stored in an electronic persistent or transitory memory. A different entity, or the same entity, may then obtain the seismic data by electronically accessing the electronic persistent memory, whether directly or over a network. Thus, the data may be measured using the instrumentation shown and described above in reference to FIGS. 1-4, for example, or in a variety of other ways, and then stored in preparation for transfer, or transferred without storage, to a system as disclosed herein.

Once gathered, the data may be locally (or remotely) stored for later retrieval from electronic persistent memory, transmitted to a receiving application, or otherwise utilized. The acquired data may be stored in persistent or transitory memory.

At block 604, the method 600 includes estimating the Gutenberg-Richter "b" parameter from the data acquired at block 602. Any suitable technique for estimating the "b" parameter may be employed.

At block 606, the method 600 includes estimating the Gutenberg-Richter "a" parameter based on the data acquired at block 602. This estimation may utilize techniques for estimating "a" as disclosed herein, e.g., in reference to FIG. 7 as described below. Other techniques may be used in the alternative.

At block 608, the method 600 includes characterizing the geological formation based on one or both of the estimated "a" and "b" parameters. The characterization may include any, or a combination, of: determining the seismogenic index, determining accurate reservoir deformation, evaluating monitoring system detection limitations, and simulation of theoretical moment variation. These and other applications are also described below in reference to FIG. 7.

Figure 7:
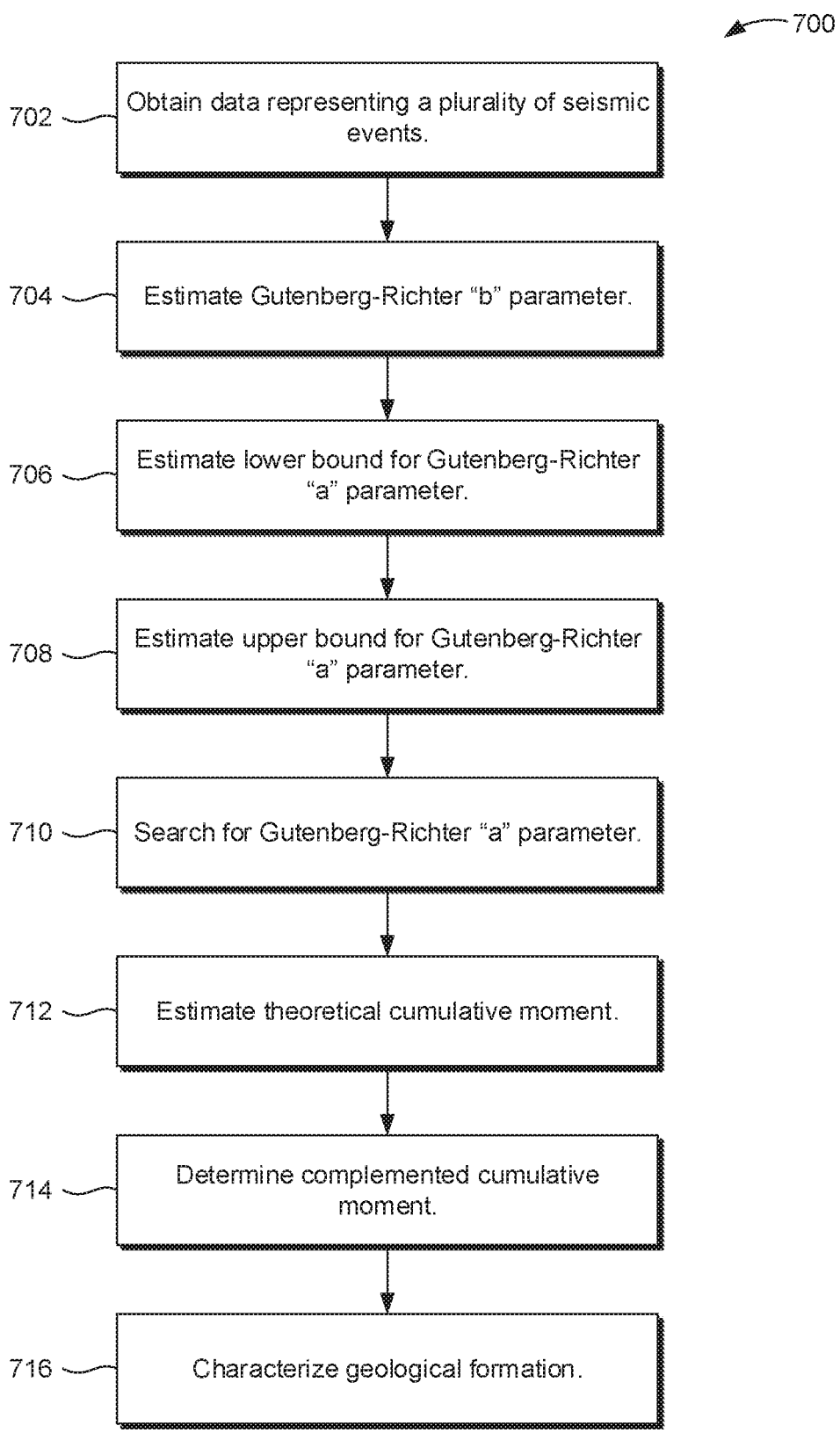
FIG. 7 illustrates a flowchart of a method of characterizing a subterranean geologic formation's response to hydraulic fracturing, according to an embodiment.

FIG. 7 is a flowchart illustrating a method 700 according to some examples. The method 700 of FIG. 7 may be implemented on a system such as that shown and described in reference to FIG. 9, for example. Further, it will be appreciated that the illustrated and below-described blocks in this method 700 may be combined, separated into two or more blocks, re-ordered, or performed simultaneously (e.g., in parallel).

At block 702, similar to block 602, the method 700 includes acquiring data representing a plurality of seismic events. The seismic events may occur as the result of hydraulic fracturing operations. The data may be obtained by retrieval from electronic persistent memory, for example, or from an entity that generates, possesses, or has access to the data. Such retrieval may be over a local network, from an attached electronic persistent storage device, or over a wide area network such as the internet, In some examples, obtaining the data is a separate, independent process from the process of generating the data by empirical measurement. Thus, in some embodiments, seismic data may be measured by one entity through the usage of for example, geophones or seismic streamers towed by a marine vehicle, and then transferred or stored in an electronic persistent or transitory memory. A different entity, or the same entity, may then obtain the seismic data by electronically accessing the electronic persistent memory, whether directly or over a network. Thus, the data may be measured using the instrumentation shown and described above in reference to FIGS. 1-4, for example, or in a variety of other ways, and then stored in preparation for transfer, or transferred without storage, to a system as disclosed herein.

Once gathered, the data may be locally (or remotely) stored for later retrieval from electronic persistent memory, transmitted to a receiving application, or otherwise utilized. The acquired data may be stored in persistent or transitory memory.

At block 704, the method 700 includes estimating the Gutenberg-Richter "b" parameter from the data acquired at block 702. This block may utilize known techniques for estimating "b".

Turning now to blocks 706, 708, and 710, these blocks are directed to estimating the "a" parameter. At block 706, the method 700 includes determining a lower bound of magnitude range for "a". There are at least three contemplated techniques for estimating such a lower bound. A first technique for estimating a lower bound for "a" utilizes known techniques for estimating "b". For example, U.S. Pat. No. 8,831,886 describes calculating a "b" value result while simultaneously estimating and correcting for the observational detection limit. Additionally, the magnitude of completeness ("MOC") can be estimated. This may be the minimum magnitude for which events over the volume where events are expected can be reliably detected by the monitoring system. The MOC value can then be used as the lower magnitude bound for "a". Alternatively, the detection-limit curve can be used in combination with the Lynden-Bell algorithm, so that the data-set are fully used rather than truncated at the MOC.

A second technique for estimating a lower bound for "a" includes estimating the MOC value from the distribution between event magnitude versus distance between event and receivers. For example, a plot of magnitude versus distance to seismic receivers may be generated, and a user may manually select a proper MOC value. An event above this value should be detected even it is the farthest one from receivers in the monitoring region. This is a graphical approximation, and may be utilized in some examples.

A third technique for estimating a lower bound for "a" may rely on seismic processing software used for assessing the performance of a microseismic monitoring network. Based on the distribution and property of receiver and formation, this software can calculate the minimum detected magnitude in different locations. As for a certain region, the largest minimum detected magnitude can be used as MOC.

Using any of these techniques (or others), block 706 results in an estimate for a lower bound for "a".

At block 708, the method 700 includes estimating an upper bound for the Gutenberg-Richter "a" parameter. Such estimation may be achieved by estimating the upper bound for the "a" value using the "b" estimation versus minimum-magnitude as an aid to analysis. This technique is presented in, for example, U.S. Pat. No. 8,831,886. Normally, plotting the "b" value versus the minimum magnitude distribution reveals a plateau range existing over the portion of the data where the detection-limit effects no longer have influence (the left end of the plot) and the under-sampling due to the rarity of large events does not yet influence the result (the right-hand end of the plot). In this situation, the upper bound of the plateau may be used as upper magnitude range for "a" value estimation Another way to estimate the upper bound for the Gutenberg-Richter "a" parameter that may be utilized in block 708 is described in U.S. Pat. No. 8,831,886. In the approach described there, an estimate of the "b" value may be obtained with upper and lower bounds. The plot of "b" value versus minimum magnitude may be constructed and these calculated upper and lower bounds overlain. The left and right magnitude extrema where the "b" value versus the minimum magnitude crosses into and leaves the upper and lower bounds serves also as an estimate of the appropriate data-set for estimation of the "a" value.

At block 710, the method 700 includes searching for an appropriate "a" value using the upper and lower bounds estimated at blocks 706 and 708. This procedure may utilize a scanning process. For example, after determining the magnitude range per blocks 706 and 708, the magnitude value may be gradually incremented from the lower bound ($M_{w\_lower}$) to the upper bound ($M_{w\_upper}$) For magnitude values ($M_{w\_i}$), the number for events with a magnitude higher or equal to current magnitude value $N(M_{w_i})$ may be counted. These counts may be performed in parallel according to some implementations.

Next, the difference may be scanned. Then, the range and scanning interval of a value (e.g., the range may be [0, 10] and interval may be 0.1) may be fixed. Since the "b" parameter value can be provided by existing estimation methods, for the "a" values, equation (1) or (2) may be used to calculate the theoretical event number (N ($Mn_{w_i}$)) of events with a magnitude higher or equal to $M_{w\_i}$ and lower than the defined upper bound (e.g., subtract the theoretical number higher than the upper bound from the theoretical number higher than the lower bound to estimate the number expected).

For "a" parameter values, the deviation between calculated result and the real data may be compared, for example, as follows:

$$dev = \sum_{M_{w\_i} \geq M_{w\_lower}}^{M_{w_i} \leq M_{w\_upper}} (N^*(M_{w_i}) = N(M_{w_i}))^2 \quad (4)$$

The "a" value that minimizes the deviation ("dev") may be selected as the estimated "a" value produced per block 710. Other values may be selected in the alternative.

At block 712, the technique determines a theoretical total moment. Based on the Gutenberg-Richter distribution, the theoretical total moment within a given magnitude range [$M_{w\_min}$, $M_{w\_max}$] may be represented as follows, using Equation (5) below, for example.

$$\int_{M_{w\_min}}^{M_{w\_max}} \frac{\partial N}{\partial M_w} \cdot M_{0(Mw)} dM_w = \int_{M_{w\_min}}^{M_{w\_max}} (b \cdot \ln(10) \cdot 10^{a-bMw}) \cdot \quad (5)$$

$$(10^{1.5Mw+9.1}) dM_w$$

$$= \int_{M_{w\_min}}^{M_{w\_max}} b \cdot \ln(10) \cdot 10^{a+9.1} \cdot$$

$$10^{(1.5-b)Mw} dM_w$$

$$= b \cdot \ln(10) \cdot 10^{a+9.1} \cdot$$

$$\int_{M_{w\_min}}^{M_{w\_max}} 10^{(1.5-b)Mw} dM_w$$

$$= [b \cdot \ln(10) \cdot 10^{a+9.1} \cdot$$

$$\frac{1}{(1.5-b)\ln 10} 10^{(1.5-b)Mw}]\Big|_{M_{w\_min}}^{M_{w\_max}}$$

$$= \left[\frac{b \cdot 10^{a+9.1}}{(1.5-b)} 10^{(1.5-b)Mw}\right]\Big|_{M_{w\_min}}^{M_{w\_max}}$$

$$= (10^{a+9.1}) * \left[\frac{10^{(1.5-b)Mw} * b}{(1.5-b)}\right]\Big|_{M_{w\_min}}^{M_{w\_max}}$$

$$= (10^{a+9.1}) * (item1 - item2),$$

-continued where $item1 = \frac{10^{(1.5-b)Mw\_max} * b}{(1.5-b)}$, and $item2 = \frac{10^{(1.5-b)Mw\_max} * b}{(1.5-b)}$.

In Equation (5), the "a" value can be calculated via the methods above, the "b" value may be determined from existing "b" value analysis methods. Based on these parameters, the theoretical total moment can be estimated by equation (5).

The "a" value represents a Poisson process, and it may be observed that the microseismic events can occur during only particular parts of a treatment stage. For example, in certain reservoir formations microseismicity may be observed at initial breakdown, at high proppant loadings, or immediately following shut-in. In the trivial case, there is a period of time before any fracture treatment begins, for which any microseismicity is unrelated to the treatment, and similarly there may be a period of time after the treatment ends. Some examples additionally include time-windowing of the microseismic data using external information, such as the pumping schedule, to extract a portion of the complete data-set over which an estimate of "a" value is to be made At block 714, the complemented cumulative moment is determined. This may be performed by integrating the theoretical result with the observed result, for example. In a real monitoring case, large magnitude events are rare. The distribution of observed events may apparently deviate from the theoretical Gutenberg-Richter distribution whenever the total number of events is small. The theoretical estimated result is therefore expected differ from the estimate based on the observations. Events with a magnitude larger or equal to MOC, and more precisely events higher than the detection-limit at any given distance, may be assumed to be detected by the monitoring system. Since the scale is exponential, the greatest proportion of the observed moment is captured by these few large events. The total moment equation can be represented as follows, by way of non-limiting example.

$$TM(M_{-\infty}, M_{w\_max}) = TM_{theory}(M_{-\infty}, MOC) + TM_{obs}(MOC, M_{w\_max}) \quad (6)$$

In Equation (6), the first term on the right is estimated total moment between $[M_{-\infty}, MOC]$ calculated by equation (5), and the second term on the right is the sum value of the observed events between $[MOC, M_{w\_max}]$. Here, $M_{-\infty}$ represents the event with zero seismic moment.

At block 716, the geological formation under consideration may be characterized using one or more of the computed quantities, e.g., complimented cumulative moment or "a" value. There are several ways in which the geological formation may be characterized.

As a first example of characterizing the geological formation, the technique may calculate a seismogenic index. The seismogenic index estimates the probability of micro-earthquakes induced during reservoir fluid stimulation, and may be independent of injection time and injection characteristics. The seismogenic index may be defined by seismo-tectonic features of a given location. A larger value of this index generally means a larger the probability of non-trivial magnitude. Some examples provide an indication (e.g., a visual indication on a computer monitor, for example) that a rate of hydraulic fluid injection should be altered in order to reduce the probability of an earthquake of a given magnitude. Some examples automatically adjust a rate of hydraulic fluid injection to reduce the probability of an earthquake of a given magnitude. The equation of seismogenic index can be represented as, by way of non-limiting example:

$$\Gamma = a - \log(F_t S) \quad (7)$$

In Equation (7), the term "a" is the "a" value in the Gutenberg-Richter distribution; the second item relates to formation, S is a poroelastic uniaxial storage coefficient, $$F_t = \frac{C_{max}}{N},$$

$C_{max}$ is the maximum critical pressure in the region, and N is the concentration of pre-existing cracks. In similar lithological settings, the formation properties may be assumed to be similar, but the "a" value may change with time and stage. This may cause the variation of the observed seismogenic index and deviation from an initially predicted value.

This disclosure presents techniques for calculating the "a" value during microseismic monitoring. This result can be applied to adjust the deviation caused by the change in "a" value and make the application of seismogenic index more robust.

As a second example of characterizing the geological formation, the methods may provide more accurate information for evaluating the hydraulic fracturing operation. In hydraulic fracturing monitoring, the total moment may be used to evaluate the reservoir deformation and to indicate the effectiveness of fracturing operations. The methods disclosed herein may estimate the total seismic moment, together with the "a" value that characterizes the rate of moment production. This provides a more accurate result for further fracturing analysis and evaluation.

As a third example of characterizing the geological formation, the methods disclosed herein may be used to evaluate the monitoring system's detection limitations. The methods may estimate both the total seismic moment produced and the "a" value representing the rate of moment production. The difference between this result and the observed total moment may yield an estimate of the missing part due to the monitoring system limitation. The difference or the ratio between estimated total moment and observed total moment can act as an index to evaluate the monitoring system limitation.

As a fourth example of characterizing the geological formation, the disclosed methods may be used to simulate a theoretical moment variation. Because the present methods allow estimation of the "a" value, the Gutenberg-Richter distribution with both "a" and "b" values may be used to generate realizations of expected seismic moment generation versus time. A detection-limit estimation can be applied to the realizations to establish the expected range of observed moment generation rates. These can be compared to the observed moment generation rate to understand whether the observations lie within the expected bounds, or whether there is a period of anomalously high moment generation (indicating, perhaps, a rapid change in geomechanical conditions during some part of the stimulation treatment).

Attention is now directed to FIGS. 8A, 8B, 8C, and 8D, which are flow diagrams illustrating a method 800 of characterizing a geological formation using Gutenberg-Richter distribution techniques, in accordance with some implementations. Some operations in method 800 may be combined and/or the order of some operations may be changed. Further, some operations in method 800 may be combined with aspects of the example workflows of FIGS. 6 and/or 7, and/or the order of some operations in method 800 may be changed to account for incorporation of aspects of the workflow illustrated by one or more of FIGS. 6 and/or 7. The techniques of FIGS. 8A, 8B, 8C, and 8D may be implemented at least partially on the system shown and described below in reference to FIG. 9. Further, it will be appreciated that the illustrated and below-described blocks in this method 800 may be combined, separated into two or more blocks, re-ordered, or performed simultaneously (e.g., in parallel).

Figure 8A:
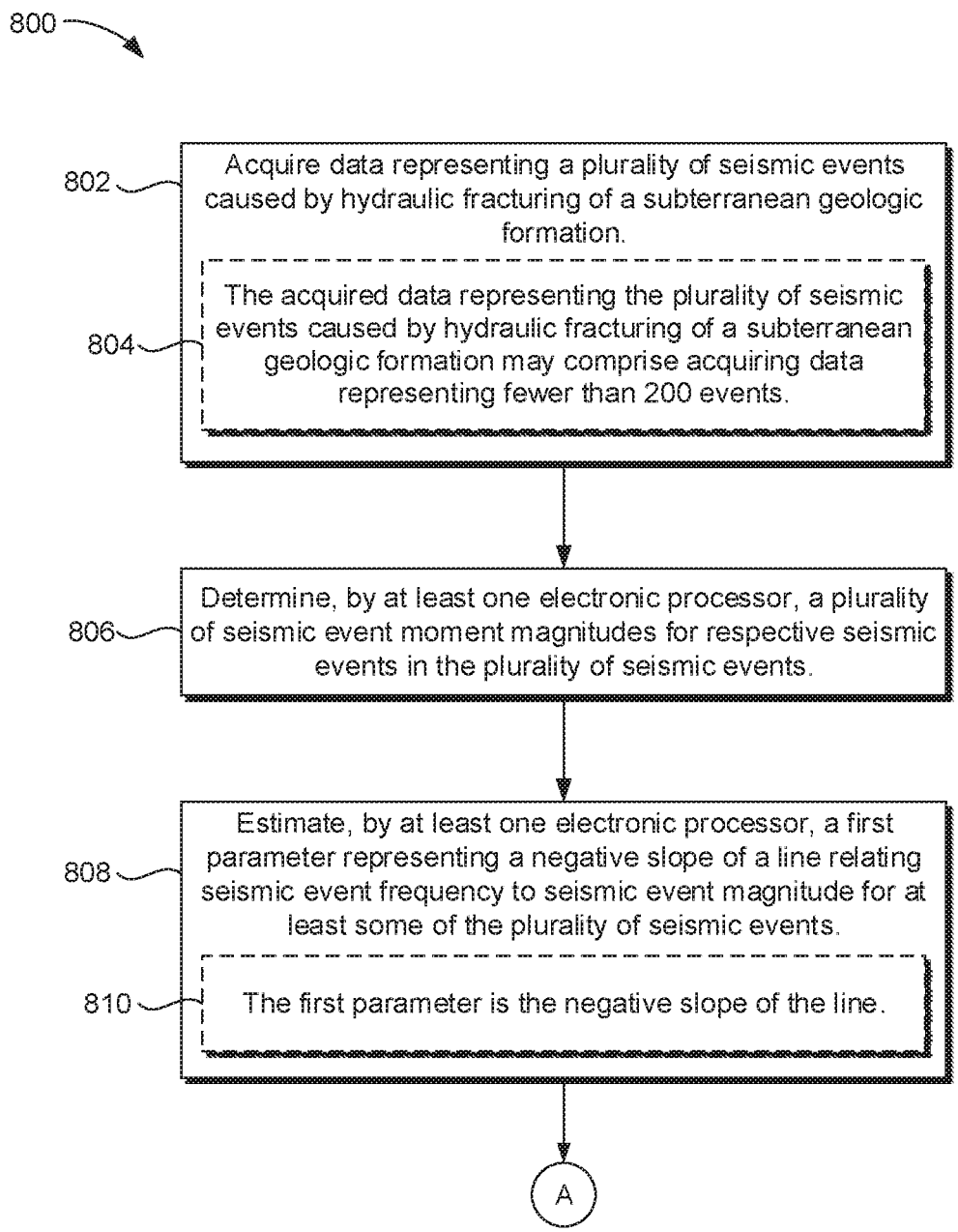
FIGS. 8A, 8B, 8C, and 8D illustrate a flowchart of a method of characterizing a subterranean geologic formation's response to hydraulic fracturing, according to an embodiment.
Figure 8B:
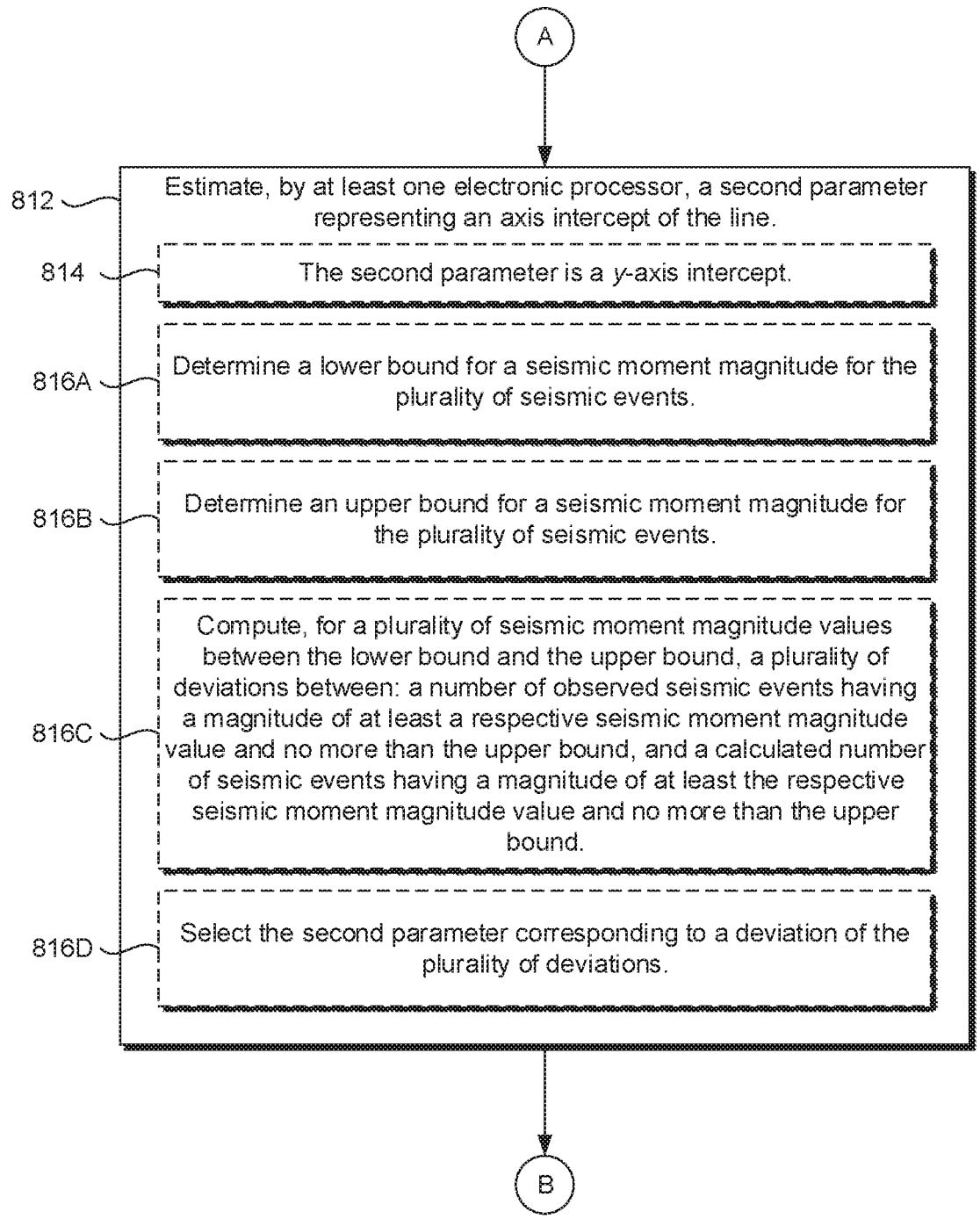
Figure 8C:
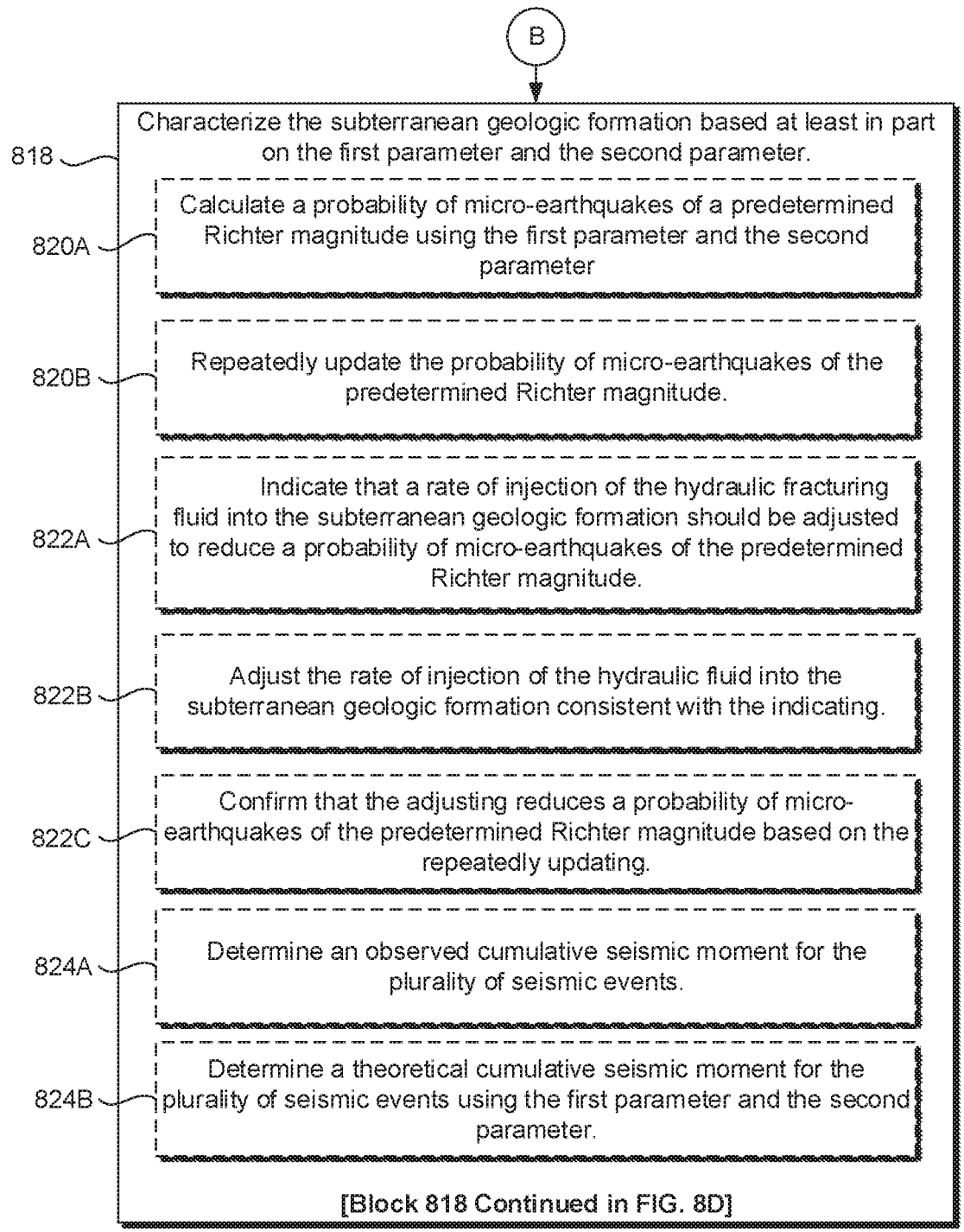
Figure 8D:
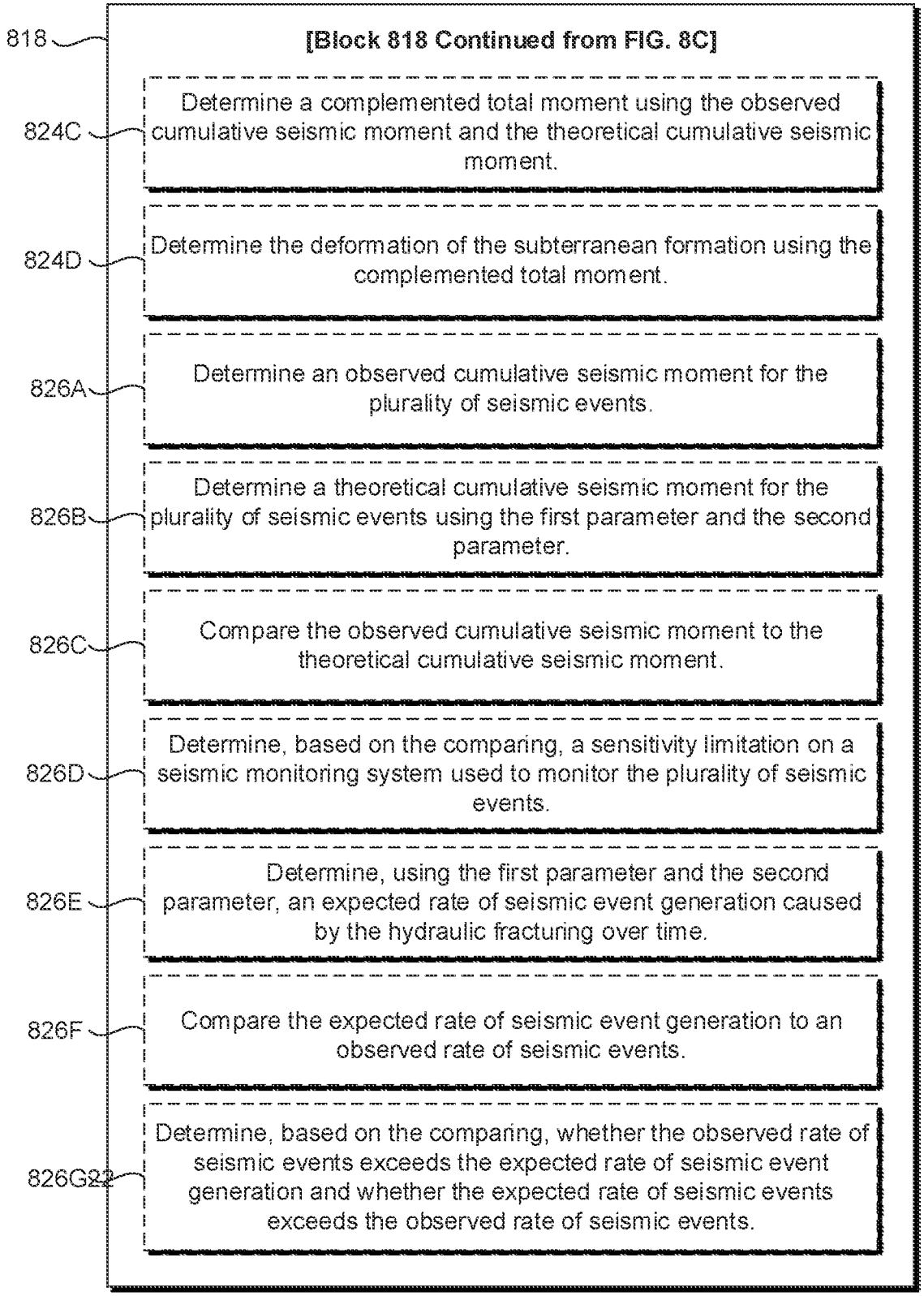

Referring now specifically to the illustrated embodiments, as shown in FIG. 8A, the method 800 may include acquiring data representing a plurality of seismic events caused by hydraulic fracturing of a subterranean geologic formation, as at 802 (e.g., FIG. 6, 602, obtain data representing a plurality of seismic events, and FIG. 7, 702, obtain data representing a plurality of seismic events). In an embodiment, the acquiring data representing a plurality of seismic events caused by hydraulic fracturing of a subterranean formation may include acquiring data representing fewer than 200 events, as at 804. It will be appreciated, however, that embodiments that omit block 804 are specifically contemplated herein.

The method 800 may also include determining, by at least one electronic processor, a plurality of seismic event moment magnitudes for respective seismic events in the plurality of seismic events, as at 806 (e.g., FIG. 5, Equation (2), $M_w$ represents moment magnitude, which can be converted from seismic moment M).

The method 800 may also include estimating, by at least one electronic processor, a first parameter representing a negative slope of a line relating seismic event frequency to seismic event magnitude for at least some of the plurality of seismic events, as at 808 (e.g., FIG. 7, 604, estimate Gutenberg-Richter "b" parameter, FIG. 7, 704, estimate Gutenberg-Richter "b" parameter). In an embodiment, the first parameter may be the negative slope, as at 810. It will be appreciated, however, that embodiments that omit block 804 are specifically contemplated herein.

The method 800 may also include estimating, by at least one electronic processor, a second parameter representing an axis intercept of the line, as at 812 (e.g., FIG. 6, 606, estimate Gutenberg-Richter "a" parameter, FIG. 7, 706, estimate lower bound for Gutenberg-Richter "a" parameter, 708, estimate upper bound for Gutenberg-Richter "a" parameter, and 710, search for Gutenberg-Richter "a" parameter). In an embodiment, the second parameter may be a second parameter may be a y-axis intercept, as at 814. In an embodiment, the estimating the second parameter includes determining a lower bound for a seismic moment magnitude for the plurality of seismic events; determining an upper bound for a seismic moment magnitude for the plurality of seismic events; computing, for a plurality of seismic moment magnitude values between the lower bound and the upper bound, a plurality of deviations between: a number of observed seismic events having a magnitude of at least a respective seismic moment magnitude value and no more than the upper bound, and a calculated number of seismic events having a magnitude of at least the respective seismic moment magnitude value and no more than the upper bound; and selecting the second parameter corresponding to a deviation of the plurality of deviations, as at 816. It will be appreciated, however, that embodiments that omit one or both of blocks 814 and 816 are specifically contemplated herein.

The method 800 may also include characterizing the subterranean geologic formation based at least in part on the first parameter and the second parameter, as at 818 (e.g., FIG. 600, 608, characterize geological formation, FIG. 700, 716, characterized geological formation).

In an embodiment, the characterizing includes calculating a probability of micro-earthquakes of a predetermined Richter magnitude using the first parameter and the second parameter, as at 820A, and repeatedly updating the probability of micro-earthquakes of the predetermined Richter magnitude, as at 820B. In some examples, the calculating may be performed during an injection of hydraulic fracturing fluid into the subterranean geologic formation. In an embodiment, the characterizing at 818 further includes indicating that a rate of injection of the hydraulic fracturing fluid into the subterranean geologic formation should be adjusted to reduce a probability of micro-earthquakes of the predetermined Richter magnitude, as at 822A. The method may also include adjusting the rate of injection of the hydraulic fluid into the subterranean geologic formation consistent with the indicating, as at 822B, and confirming that the adjusting reduces a probability of micro-earthquakes of the predetermined Richter magnitude based on the repeatedly updating, as at 822C. In some examples, the rate of injection may be automatically adjusted. In an embodiment, the characterizing includes determining an observed cumulative seismic moment for the plurality of seismic events, as at 824A, determining a theoretical cumulative seismic moment for the plurality of seismic events using the first parameter and the second parameter, as at 824B; determining a complemented total moment using the observed cumulative seismic moment and the theoretical cumulative seismic moment, as at 824C; and determining the deformation of the subterranean reservoir using the complemented total moment, as at 824D.

In an embodiment, the characterizing at 818 includes determining an observed cumulative seismic moment for the plurality of seismic events, as at 826A, determining a theoretical cumulative seismic moment for the plurality of seismic events using the first parameter and the second parameter, as at 826B, comparing the observed cumulative seismic moment to the theoretical cumulative seismic moment, as at 826C, and determining, based on the comparing, a sensitivity limitation on a seismic monitoring system used to monitor the plurality of seismic events, as at 826D.

In an embodiment, the characterizing at 818 includes determining, using the first parameter and the second parameter, an expected rate of seismic event generation caused by the hydraulic fracturing over time, as at 826E, comparing the expected rate of seismic event generation to an observed rate of seismic events, as at 826F, and determining, based on the comparing, whether the observed rate of seismic events exceeds the expected rate of seismic event generation and whether the expected rate of seismic events exceeds the observed rate of seismic events, as at 826G. The observed rate may be measured directly, or determined from data provided by a separate entity that performs the measurement.

III. Example Hardware and Other Equipment

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 9:
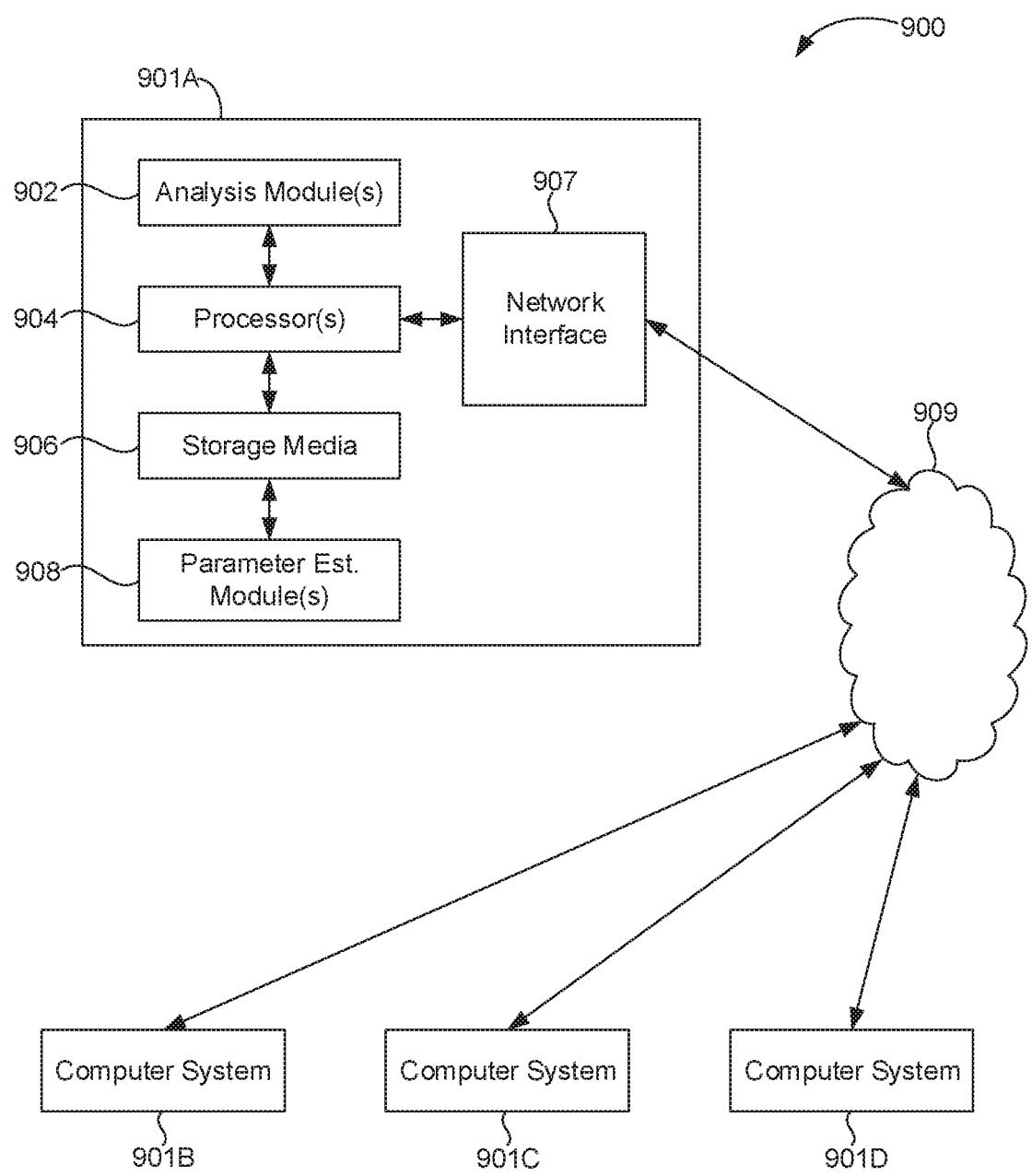
FIG. 9 illustrates a schematic view of a computing system, according to an embodiment.

In some embodiments, any of the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis module(s) 902 configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor can include a microprocessor, microcontroller, processor module or subsystem, programmable integrated circuit, programmable gate array, or another control or computing device.

The storage media 906 can be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 900 contains one or more parameter estimation ("est.") module(s) 908. In the example of computing system 900, computer system 901A includes the parameter estimation module 908. In some embodiments, a single parameter estimation module may be used to perform some or all aspects of one or more embodiments of the methods. In alternate embodiments, a plurality of parameter estimation modules may be used to perform some or all aspects of methods.

It should be appreciated that computing system 900 is only one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A computer-implemented method of characterizing a subterranean geologic formation's response to hydraulic fracturing, the method comprising:
 acquiring data representing a plurality of seismic events caused by hydraulic fracturing of the subterranean geologic formation;

determining, by at least one electronic processor, a plurality of seismic event moment magnitudes for respective seismic events in the plurality of seismic events;

estimating, by at least one electronic processor, a first parameter representing a negative slope of a line relating seismic event frequency to seismic event magnitude for at least some of the plurality of seismic events;

estimating, by at least one electronic processor, a second parameter representing an axis intercept of the line; and characterizing the subterranean geologic formation based at least in part on the first parameter and the second parameter, wherein the characterizing comprises:

comparing an observed cumulative seismic moment for the plurality of seismic events to a theoretical cumulative seismic moment for the plurality of seismic events using the first parameter and the second parameter;

determining, based on the comparing, a sensitivity limitation on a seismic monitoring system used to monitor the plurality of seismic events;

calculating a probability of micro-earthquakes of a predetermined Richter magnitude using at least the second parameter;

indicating that a rate of injection of a hydraulic fracturing fluid into the subterranean geologic formation should be adjusted to reduce the probability of micro-earthquakes of the predetermined Richter magnitude adjusting the rate of injection of the hydraulic fracturing fluid into the subterranean geologic formation consistent with the indicating; and confirming, after the adjustment of the rate of injection of the hydraulic fracturing fluid into the subterranean geologic formation consistent with the indicating, that the adjustment reduced the probability of micro-earthquakes of the predetermined Richter magnitude.

2. The method of claim 1, wherein the estimating the second parameter comprises:

determining a lower bound for a seismic moment magnitude for the plurality of seismic events;

determining an upper bound for a seismic moment magnitude for the plurality of seismic events;

computing, for a plurality of seismic moment magnitude values between the lower bound and the upper bound, a plurality of deviations between: a number of observed seismic events having a magnitude of at least a respective seismic moment magnitude value and no more than the upper bound, and a calculated number of seismic events having a magnitude of at least the respective seismic moment magnitude value and no more than the upper bound; and selecting the second parameter corresponding to a deviation of the plurality of deviations.

3. The method of claim 1, wherein the characterizing further comprises:

repeatedly updating the probability of micro-earthquakes of the predetermined Richter magnitude.

4. The method of claim 1, wherein the characterizing further comprises:

determining the observed cumulative seismic moment for the plurality of seismic events;

determining the theoretical cumulative seismic moment for the plurality of seismic events using the first parameter and the second parameter;

determining a complemented total moment using the observed cumulative seismic moment and the theoretical cumulative seismic moment; and determining a deformation of the subterranean reservoir using the complemented total moment.

5. The method of claim 1, wherein the characterizing further comprises:

determining, using the first parameter and the second parameter, an expected rate of seismic event generation caused by the hydraulic fracturing over time;

comparing the expected rate of seismic event generation to an observed rate of seismic events; and determining, based on the comparing, whether the observed rate of seismic events exceeds the expected rate of seismic event generation and whether the expected rate of seismic event generation exceeds the observed rate of seismic events.

6. The method of claim 1, wherein the first parameter is the negative slope of the line.

7. The method of claim 1, wherein the second parameter is an intercept of the line and an axis representing the seismic event frequency.

8. The method of claim 1, wherein the acquiring data representing the plurality of seismic events comprises acquiring data representing fewer than 200 seismic events.

9. A computing system, comprising:

one or more electronic processors; and a memory system comprising one or more computer-readable media storing instructions thereon that, when executed by the one or more processors, are configured to cause the computing system to perform operations for characterizing a subterranean geologic formation's response to hydraulic fracturing, the operations comprising:

acquiring data representing a plurality of seismic events caused by hydraulic fracturing of the subterranean geologic formation;

determining a plurality of seismic event moment magnitudes for respective seismic events in the plurality of seismic events;

estimating a first parameter representing a negative slope of a line relating seismic event frequency to seismic event magnitude for at least some of the plurality of seismic events;

estimating a second parameter representing an axis intercept of the line; and characterizing the subterranean geologic formation based at least in part on the first parameter and the second parameter, wherein the characterizing comprises:

comparing an observed cumulative seismic moment for the plurality of seismic events to a theoretical cumulative seismic moment for the plurality of seismic events using the first parameter and the second parameter;

determining, based on the comparing, a sensitivity limitation on a seismic monitoring system used to monitor the plurality of seismic events;

calculating a probability of micro-earthquakes of a predetermined Richter magnitude using at least the second parameter;

indicating that a rate of injection of a hydraulic fracturing fluid into the subterranean geologic formation should be adjusted to reduce the probability of micro-earthquakes of the predetermined Richter magnitude adjusting the rate of injection of the hydraulic fracturing fluid into the subterranean geologic formation consistent with the indicating; and confirming, after the adjustment of the rate of injection of the hydraulic fracturing fluid into the subterranean geologic formation consistent with the indicating, that the adjustment reduced the probability of micro-earthquakes of the predetermined Richter magnitude.

10. The system of claim 9, wherein the estimating the second parameter comprises:
   determining a lower bound for a seismic moment magnitude for the plurality of seismic events;
   determining an upper bound for a seismic moment magnitude for the plurality of seismic events;
   computing, for a plurality of seismic moment magnitude values between the lower bound and the upper bound, a plurality of deviations between: a number of observed seismic events having a magnitude of at least a respective seismic moment magnitude value and no more than the upper bound, and a calculated number of seismic events having a magnitude of at least the respective seismic moment magnitude value and no more than the upper bound; and
   selecting the second parameter corresponding to a deviation of the plurality of deviations.

11. The system of claim 9, wherein the characterizing further comprises:
   repeatedly updating the probability of micro-earthquakes of the predetermined Richter magnitude.

12. The system of claim 9, wherein the characterizing further comprises:
   determining the observed cumulative seismic moment for the plurality of seismic events;
   determining the theoretical cumulative seismic moment for the plurality of seismic events using the first parameter and the second parameter;
   determining a complemented total moment using the observed cumulative seismic moment and the theoretical cumulative seismic moment; and
   determining a deformation of the subterranean reservoir using the complemented total moment.

13. The system of claim 9, wherein the characterizing further comprises:
   determining, using the first parameter and the second parameter, an expected rate of seismic event generation caused by the hydraulic fracturing over time;
   comparing the expected rate of seismic event generation to an observed rate of seismic events; and
   determining, based on the comparing, whether the observed rate of seismic events exceeds the expected rate of seismic event generation and whether the expected rate of seismic event generation exceeds the observed rate of seismic events.

14. The system of claim 9, wherein the first parameter is the negative slope of the line.

15. The system of claim 9, wherein the second parameter is an intercept of the line and an axis representing the seismic event frequency.

16. The system of claim 9, wherein the acquiring data representing the plurality of seismic events comprises acquiring data representing fewer than 200 seismic events.

* * * * *